United States Patent
Albert et al.

(10) Patent No.: US 11,162,367 B2
(45) Date of Patent: Nov. 2, 2021

(54) ROTOR BLADE AIRFOIL FOR A TURBOMACHINE

(71) Applicant: MTU Aero Engines AG, Munich (DE)

(72) Inventors: Benedikt Albert, Munich (DE); Siegfried Sikorski, Munich (DE)

(73) Assignee: MTU Aero Engines AG, Munich (DE)

( * ) Notice: Subject to any disclaimer, the term of this patent is extended or adjusted under 35 U.S.C. 154(b) by 69 days.

(21) Appl. No.: 16/715,045

(22) Filed: Dec. 16, 2019

(65) Prior Publication Data

US 2020/0200015 A1 Jun. 25, 2020

(30) Foreign Application Priority Data

Dec. 19, 2018 (DE) .......................... 102018222246.0

(51) Int. Cl.
  *F01D 5/14* (2006.01)
  *C04B 35/628* (2006.01)
  *C04B 35/80* (2006.01)

(52) U.S. Cl.
  CPC ........ *F01D 5/147* (2013.01); *C04B 35/62844* (2013.01); *C04B 35/80* (2013.01); *C04B 2235/5256* (2013.01); *F05D 2230/20* (2013.01); *F05D 2240/30* (2013.01); *F05D 2300/603* (2013.01); *F05D 2300/6033* (2013.01)

(58) Field of Classification Search
  CPC . C04B 35/80; C04B 2235/5256; F01D 5/147; F01D 5/284; F05D 2230/20; F05D 2240/30; F05D 2300/603; F05D 2300/23; F05D 2300/6033
  See application file for complete search history.

(56) References Cited

U.S. PATENT DOCUMENTS

| | | | |
|---|---|---|---|
| 3,883,267 A | 5/1975 | Baudier et al. | |
| 4,022,547 A | 5/1977 | Stanley | |
| 6,843,565 B2 * | 1/2005 | Evans | F01D 5/282 353/28 |

(Continued)

FOREIGN PATENT DOCUMENTS

| | | |
|---|---|---|
| DE | 2339468 A1 | 2/1974 |
| DE | 2644083 A1 | 4/1977 |

(Continued)

OTHER PUBLICATIONS

Boyle: "Shrouded CMC Rotor Blades for High Pressure Turbine Applications ," GT2018-76827 Proceedings of ASME Turbo Expo 2018 Turbomachinery Technical Conference and Exposition GT2018 Jun. 11-15, 2018, Oslo, Norway.

(Continued)

*Primary Examiner* — Ninh H. Nguyen
(74) *Attorney, Agent, or Firm* — Davidson, Davidson & Kappel, LLC

(57) ABSTRACT

A rotor blade airfoil (25) for a turbomachine (1) that is adapted for rotation about a longitudinal axis (2) of the turbomachine (1) is provided. The rotor blade airfoil (25) is built from an airfoil material reinforced with a fibrous material (30). At least a portion of the fibers of the fibrous material (30), in particular at least 20%, preferably at least 30% of the fibers, are oriented in a first fiber direction (31), and the first fiber direction (31) is tilted with respect to the stacking axis of the rotor blade airfoil (25).

22 Claims, 2 Drawing Sheets

(56) References Cited

U.S. PATENT DOCUMENTS

| | | | |
|---|---|---|---|
| 7,247,212 B2* | 7/2007 | Kostar | D03D 25/005 |
| | | | 156/89.11 |
| 9,005,382 B2* | 4/2015 | Steibel | C04B 35/62871 |
| | | | 156/89.11 |
| 9,845,688 B2* | 12/2017 | Thomas | F01D 5/282 |
| 2011/0293828 A1 | 12/2011 | Eberling-Fux et al. | |
| 2013/0230404 A1 | 9/2013 | Duval et al. | |
| 2017/0101873 A1* | 4/2017 | Morgan | C04B 35/573 |
| 2017/0298745 A1* | 10/2017 | Freeman | F04D 29/023 |

FOREIGN PATENT DOCUMENTS

| | | |
|---|---|---|
| EP | 3181814 A1 | 6/2017 |
| EP | 3287265 A1 | 2/2018 |
| FR | 2 195255 A5 | 3/1974 |
| GB | 901075 A | 7/1962 |

OTHER PUBLICATIONS

Zhao et al.:"The effect of fiber orientation on failure behavior of 3DN C/SiC torque tube ," Ceramics International 44 (2018) 4190-4197.

Shi et al. "Inspection of geometry influence and fiber orientation to characteristic value for short fiber reinforced ceramic matrixcomposite under bending load ,"Journal of the European Ceramic Society 37 (2017) 1291-1303.

* cited by examiner

ROTOR BLADE AIRFOIL FOR A TURBOMACHINE

This claims the benefit of German Patent Application DE 102018222246.0, filed Dec. 19, 2018 and hereby incorporated by reference herein The present invention relates to rotor blade airfoil for a turbomachine.

BACKGROUND

The turbomachine may be, for example, a jet engine, such as a turbofan engine. The turbomachine is functionally divided into a compressor, a combustor and a turbine. In the case of the jet engine, for example, intake air is compressed by the compressor and mixed and burned with jet fuel in the downstream combustor. The resulting hot gas, a mixture of combustion gas and air, flows through the downstream turbine and is expanded therein. The turbine is typically divided into several modules; i.e., it may include, for example, a high-pressure turbine module and a low-pressure turbine module. Each of these turbine modules typically includes a plurality of stages, each stage being composed of a stator vane ring and a rotor blade ring downstream thereof. The compressor is also typically made up of a plurality of stages or modules; i.e., includes a plurality of rotor blade rings. The rotor blade airfoil discussed below may be find application both in the compressor and in the turbine, the latter being preferred.

SUMMARY OF THE INVENTION

The present invention addresses the technical problem of providing a particularly advantageous rotor blade airfoil.

The present invention provides a blade airfoil. This rotor blade airfoil is built from an airfoil material that is mechanically reinforced with fibers. The orientations of the fibers are not stochastically distributed, but there are one or more preferential directions (hereinafter referred to as "fiber directions"). A distinctive feature here resides in the orientation(s) of this or these fiber direction(s); specifically in that a first fiber direction is tilted with respect to the stacking axis, which connects the centroids of the cross sections of the airfoil. In principle, it could be assumed that orienting the fibers only in the longitudinal direction of the airfoil; i.e., namely along the stacking axis, would provide optimum and adequate mechanical reinforcement. The inventors have found, however, that by tilting the first fiber direction, better adaptation to the actual load profile can be achieved. Due to the rotation and expansion of the airfoil material, the orientation of the centrifugal force vector changes so that it is inclined relative to the stacking axis during operation. Because the first fiber direction is oriented inclined with respect to the stacking axis, it can be achieved that during operation, the first fiber direction will be oriented parallel to the principal load direction, namely the direction of the resulting centrifugal force vector. As a result, these fibers which are oriented inclined with respect to stacking axis can optimally contribute to the accommodation of loads. Since the maximum load does not act obliquely to but along these fibers, it is also possible to reduce shear forces between these fibers. This makes it possible to reduce the load on the embedding matrix material and to increase component strength.

Preferred embodiments will be apparent from the entire description. In the description of the features, a distinction is not always drawn specifically between the rotor blade airfoil, a corresponding turbine module, and associated manufacturing methods. The disclosure is to be read to at least imply all claim categories.

The proportion of the fibers of the rotor blade airfoil that are oriented in the first fiber direction may, in some embodiments, be at least 20% or even at least 30% of the fibers of the rotor blade airfoil.

In the context of the present disclosure, "axial" generally relates to the longitudinal axis of the turbomachine, which coincides, for example, with an axis of rotation of the rotor blade airfoils or rings. "Radial" refers to the radial directions that are perpendicular thereto and point away therefrom; and a "circumference," respectively "circumferential" or the "direction of rotation" relate to the rotation about the longitudinal axis. In the context of the present disclosure, "a" and "an" are to be read as indefinite articles and thus always also as "at least one," unless expressly stated otherwise. Thus, for example, a rotor blade ring has a plurality of rotor blade airfoils according to the present invention.

As is evident from the appraisal of the prior art, which is expressly considered to be part of the disclosure, the rotor blade airfoil is disposed in the gas flow path of the turbomachine, either in the compressor gas path or in the hot gas path, depending on the application. When viewed with respect to the flow around the airfoil in the gas flow path, the airfoil has an upstream leading edge and a downstream trailing edge, as well as two side surfaces connecting the leading and trailing edges (and forming suction and pressure sides). The orientation of the fibers, as set forth in the main claim and concretized in more specific detail in the dependent claims, should at least be present in the side surfaces of the airfoil. Due to the geometry of the airfoil, deviations may exist at the leading/trailing edge.

Considered with respect to the fibrous material; i.e., the prepreg, the fiber directions preferably lie in one plane. In the airfoil, the prepreg may then also be curved, for example, curve along the side surface according to the shape of the profile or otherwise disposed or oriented. In this case, the individual fiber directions will not necessarily lie in a planar plane everywhere; i.e., in all volume elements of the blade. This means that the above-mentioned first fiber direction and, correspondingly, further (e.g., second and third) fiber directions may each point in different directions or be differently oriented at different locations or in different volume elements within the blade. However, in the volume elements themselves, the fibers may have substantially the same orientation relative to each other. As mentioned earlier, in a preferred embodiment, the first fiber direction is oriented along the direction of force resulting from the centrifugal force vector and the gas force vector. Orientation "along" the direction of force means an extension substantially parallel thereto; i.e., a tilt of no more than 5°, 4°, 3°, 2° or 1°. Preferably, the first fiber direction is actually parallel to the direction of force (0°). The fibers oriented along the centrifugal force vector, corrected by the gas forces, also make it possible to minimize shear forces between the fibers, so that ultimately the vector of the centrifugal force is optimally supported.

The direction of force is ideally determined for an operating point where the highest rotational speed/maximum load of the rotor blade airfoil is attained. In the case of the aircraft engine, this may correspond, for example, to the conditions at take-off. Because of the gas forces, the resulting direction of force then not only has the radial component resulting from the centrifugal force, but also an axial component. Although the proportion of the axial component will be less than that of the centrifugal force, the strength can be significantly increased with the corresponding orientation.

In accordance with a preferred embodiment, the first fiber direction is tilted with respect to a stacking axis of the rotor blade airfoil by at least 2°, further and particularly preferably by at least 3° or 4°. Advantageous upper limits, which are to be disclosed also independently of the lower limits, are no more than 10°, 9°, 8°, 7°, 6° or 5°, with increasing preference in the order given. The stacking axis is formed by a line connecting the centroids of the cross sections of the rotor blade airfoil. Preferably, the stacking axis is itself tilted with respect to the radial direction; i.e., the airfoil has a lean. The lean is typically selected such that during operation, the blade is free of momentum at its root, namely when, analogously to the aforedescribed procedure, centrifugal and gas forces are taken into account.

In some embodiments, the first fiber direction is tilted, e.g., by at least 15°, with respect to a radial direction perpendicular to the longitudinal axis. In some of these embodiments, the stacking axis may also be tilted with respect to the radial direction.

Preferably, as mentioned earlier, there is not only one preferential direction, but a plurality of preferential directions (a second and possibly a third fiber direction) in the rotor blade airfoil; i.e., in the prepreg formed/sintered into the same. These further fiber directions are each at an angle (of preferably between 30° and 60°) to the first fiber direction, especially at the respective location or in the respective volume element under consideration. The fibers oriented in the second and/or third fiber direction(s) are particularly advantageously able to carry loads transverse to the first fiber direction, for example, during torsion and/or bending. Although such transverse loads are generally much lower than the centrifugal force-induced main load along the first fiber direction, even relatively low transverse loads can cause shearing between the fibers of the first fiber direction, thereby significantly impairing and/or limiting the strength of the fiber-reinforced composite material. By providing one or more further fiber directions, it is possible to selectively absorb these detrimental transverse loads and to minimize stresses between the individual fibers, thereby making it possible to reduce the load on the matrix material. This makes it possible to significantly increase the strength, in particular the strength potential with regard to creep deformation, especially for the loads in the turbine section.

In some embodiments, a proportion of at least 20% or even at least 30% of all fibers of the rotor blade airfoil are oriented in the second fiber direction.

In a preferred embodiment, the first fiber direction and the second fiber direction form an angle $\alpha_1$ of at least 10°, further and particularly preferably of at least 20° or 30°, therebetween. Generally, the angle may also be 90°, in particular if the fibrous material is a woven fabric, especially one made of ceramic fibers (in which there are two perpendicular fiber directions). However, it is also possible to provide a smaller angle $\alpha_1$, for example, of no more than 80° or 70°; about 60° may be particularly preferred.

In accordance with a preferred embodiment, a further portion of the fibers, for example, at least 15% or at least 20% of the fibers of the rotor blade airfoil, have a third fiber direction which is at an angle to the first and second fiber directions. The first fiber direction and the third fiber direction form an angle $\alpha_2$ of at least 10°, further and particularly preferably of at least 20° or 30°, therebetween. Advantageous upper limits are no more than 90°, 80° or 70°, again with increasing preference in the order given, and about 60° may be particularly preferred. Preferably, angles $\alpha_1$ and $\alpha_2$ are equal in magnitude. When considering angles between the fiber directions, the smaller of two angles formed between the two directions is generally taken as a basis.

The fibrous material or prepreg is preferably a woven fabric or a braided fabric, especially one made of ceramic fibers. Preferably, the fiber preform has exactly two fiber directions (in the case of a woven fabric) or exactly three fiber directions (in the case of a braided fabric). The first fiber direction is preferably the primary fiber direction, so the correspondingly oriented fibers make up the largest proportion by weight of the fibrous material or prepreg. The direction of the centrifugal force (corrected by the gas force vector) is the direction in which the highest forces act on the rotor blade airfoil, which is why a more than proportionate number of fibers are oriented correspondingly. The second and third fiber directions are then secondary fiber directions. As mentioned, these allow the airfoil to be stabilized with respect to torsional and/or bending moments, which may bring about significant advantages over a solely unidirectional reinforcement.

In a preferred embodiment, the airfoil material is ceramic and the fibers are also ceramic. The airfoil material is preferably a ceramic matrix composite (CMC) material including ceramic fibers embedded in a ceramic matrix. Ceramic materials may be of interest with respect to temperature resistance and especially with regard to applications in the turbine section. Preferably, the fibers and the matrix material provided are composed of the same ceramic material, which may be advantageous with respect to reducing or preventing different thermal expansions. Examples of possible ceramics include aluminum oxide and silicon carbide.

The present invention also relates to a turbine module, in particular a low-pressure turbine module, having a rotor blade airfoil according to the present disclosure. Preferably, at least one rotor blade ring is fully equipped with corresponding rotor blade airfoils. It is also possible that a plurality of such rotor blade rings may be provided. The advantages of the fiber reinforcement adapted in accordance with the present invention are particularly noticeable in the high-speed low-pressure turbine.

The present invention also relates to a computer-implemented method for designing a corresponding airfoil or turbine module. In such method, the centrifugal force vector and the gas force vector acting during operation are determined based on a computer model of the rotor blade airfoil; i.e., based on a CAD model. This can be done, e.g., in a finite element simulation. In such simulation, the operating point where the highest load occurs; i.e., where the rotational speed is typically maximum, is taken as a basis. The sum of these forces results in a direction of force that is tilted with respect to the radial direction. This determines the orientation of the first fiber direction of the prepreg.

The present invention also relates to a method for manufacturing a rotor blade airfoil or a turbine module, in which method, following the just described design process, the rotor blade airfoil is manufactured by embedding the prepreg; i.e., the fibrous material, in the matrix material so as to provide the rotor blade airfoil material. Depending on the material, the embedding itself may be accomplished during a sintering operation (aluminum oxide), but the solidification process may also by accompanied by the formation of chemical compounds during a high temperature treatment (silicon carbide).

BRIEF DESCRIPTION OF THE DRAWINGS

The present invention will now be explained in more detail with reference to an exemplary embodiment. The individual features may also be essential to the invention in other combinations within the scope of the other independent claims, and, as above, no distinction is specifically made between different claim categories.

In the drawing.

DETAILED DESCRIPTION

Figure 1:
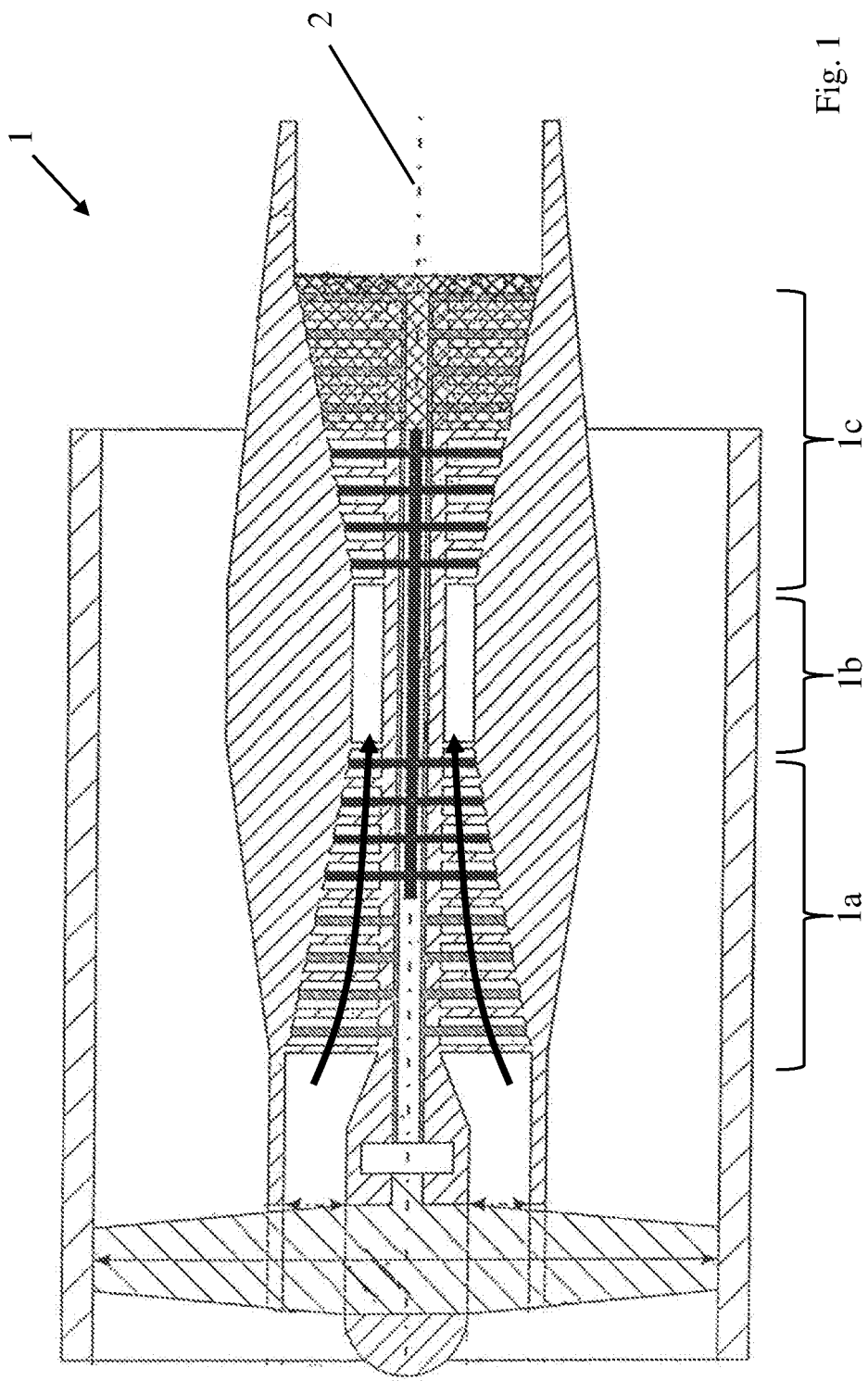
FIG. 1 is an axial cross-sectional view of a jet engine.

FIG. 1 shows in axial section a turbomachine 1, specifically a turbofan engine. Turbomachine 1 is functionally divided into a compressor 1a, a combustor 1b and a turbine 1c. Both compressor 1a and turbine 1c are made up of a plurality of stages, each stage being composed of a stator vane ring and a subsequent rotor blade ring. During operation, the rotor blade rings rotate about longitudinal axis 2 of turbomachine 1. The intake air is compressed in compressor 1a, and is then mixed and burned with jet fuel in the downstream combustor 1b. The hot gas flows through hot gas path 3, thereby driving the rotor blade rings that rotate about longitudinal axis 2.

Figure 2:
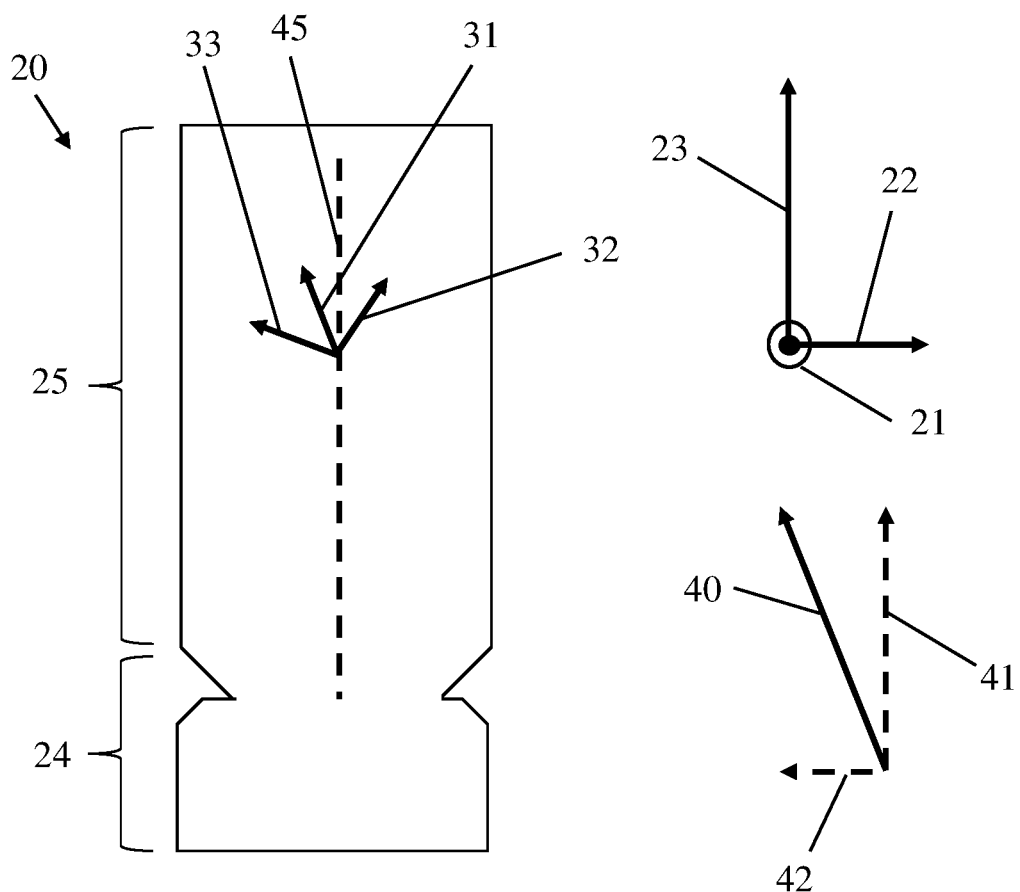
FIG. 2 is a schematic side view of a rotor blade airfoil.

FIG. 2 shows a rotor blade 20 in a schematic side view, looking in a direction opposite to the direction of rotation 21 (further indicated are the axial direction 22 as well as the radial direction 23). Rotor blade 20 is part of a rotor blade ring in turbine 1c. Rotor blade 20 has a blade root 24 at its radially inner end and a radially outward rotor blade airfoil 25 disposed in the gas flow path. Rotor blade 20; i.e., rotor blade airfoil 25, is manufactured from a ceramic material in which a fibrous material 30 is embedded for mechanical reinforcement (see FIG. 3).

Figure 3:
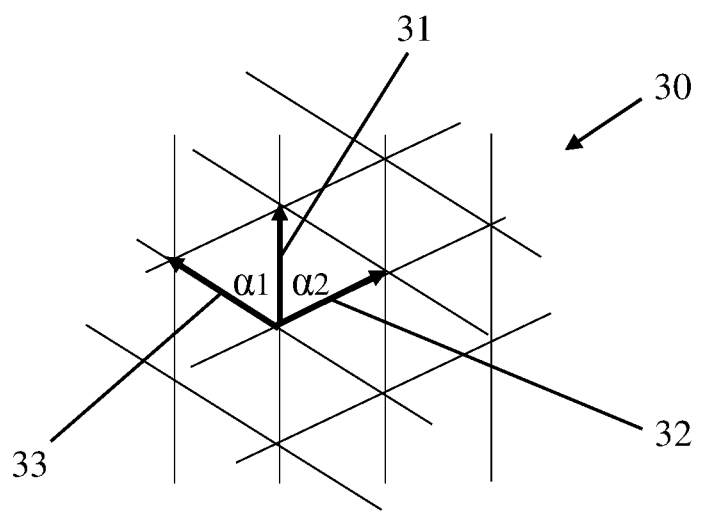
FIG. 3 is a schematic view showing a fibrous material embedded in the rotor blade airfoil of FIG. 2 for purposes of reinforcement.

FIG. 3 shows fibrous material 30 in schematic form. There are three preferential directions: A first fiber direction 31 is the primary fiber direction (largest proportion by weight of fiber material 30). There is also a second fiber direction 32, namely a secondary fiber direction, which forms an angle $\alpha_1$ of about 60° with first fiber direction 31. Furthermore, there is a third fiber direction 33 (also a secondary fiber direction), which forms an angle $\alpha_2$ of also about 60° with first fiber direction 31. A corresponding fibrous material 30 may be produced as a braided fabric of fibers provided in the form of filaments or threads.

Fibrous material 30 is embedded in rotor blade airfoil 25 in such a way that first fiber direction 31 is tilted with respect to radial direction 23. This orientation is a result of the fact that in the determination of a direction of force 40 acting on rotor blade airfoil 25 during operation, not only a centrifugal force vector 41, but also a gas force vector 42 is taken into account. The second and third fiber directions 32, 33 lying within rotor blade airfoil 25 are also slightly tilted correspondingly; they stabilize it with respect to torsion and bending.

As can be seen in the view of FIG. 2, first fiber direction 31 is tilted with respect to a stacking axis 45 (a line connecting the centroids of the cross sections of the airfoil). For the sake of simplicity, stacking axis 45 is here shown parallel to radial direction 23. In practice, it will also have a certain tilt with respect thereto.

LIST OF REFERENCE NUMERALS turbomachine 1
compressor 1a
combustor 1b
turbine 1c
longitudinal axis 2
rotor blade 20
direction of rotation 21
axial direction 22
radial direction 23
blade root 24
rotor blade airfoil 25
fibrous material 30
first fiber direction (primary fiber direction) 31
second fiber direction (secondary fiber direction) 32
third fiber direction (secondary fiber direction) 33
direction of force 40
centrifugal force vector 41
gas force vector 42
stacking axis 45

What is claimed is:

1. A rotor blade airfoil for a turbomachine and adapted for rotation about a longitudinal axis of the turbomachine, the rotor blade airfoil comprising:
   an airfoil material reinforced with a fibrous material,
   at least a portion of the fibers of the fibrous material being oriented in a first fiber direction, the first fiber direction being tilted with respect to a stacking axis of the rotor blade airfoil; wherein the first fiber direction is oriented along a direction of force obtained by vector addition of a centrifugal force vector and a gas force vector acting on the rotor blade airfoil during operation.

2. The rotor blade airfoil as recited in claim 1 wherein the first fiber direction is tilted by at least 2° and no more than 10° with respect to the stacking axis of the rotor blade airfoil, the stacking axis being defined as a line connecting centroids of the cross sections of the rotor blade airfoil, or wherein the first fiber direction is tilted with respect to a radial direction perpendicular to the longitudinal axis.

3. The rotor blade airfoil as recited in claim 1 wherein another portion of the fibers of the fibrous material are in a second fiber direction at an angle to the first fiber direction.

4. The rotor blade airfoil as recited in claim 3 wherein the first fiber direction and the second fiber direction form an angle α1 of at least 10° and no more than 90° therebetween.

5. The rotor blade airfoil as recited in claim 3 wherein a further portion of the fibers in the fibrous material oriented in a third fiber direction at an angle to the first fiber direction and to the second fiber direction.

6. The rotor blade airfoil as recited in claim 5 wherein the first fiber direction and the third fiber direction form an angle α2 of at least 10° and no more than 90° therebetween.

7. The rotor blade airfoil as recited in claim 5 wherein the first fiber direction and the second fiber direction in the fibrous material form an angle α1 therebetween, and the first fiber direction and the third fiber direction form an angle α2 therebetween, with α1 and α2 being equal in magnitude.

8. The rotor blade airfoil as recited in claim 7 wherein α1 and α2 are each between 30° and 75°.

9. The rotor blade airfoil as recited in claim 8 wherein α1 and α2 each equal 60°.

10. The rotor blade airfoil as recited in claim 5 wherein at least 15% oriented in the third fiber direction.

11. The rotor blade airfoil as recited in claim 3 wherein a proportion by weight of the fibers in the fibrous material oriented in the first fiber direction is larger than a respective proportion by weight of the fibers that are oriented in the second fiber direction.

12. The rotor blade airfoil as recited in claim 3 wherein at least 20% are oriented in the second fiber direction.

13. The rotor blade airfoil as recited in claim 1 wherein the fibrous material is a woven fabric or a braided fabric.

14. The rotor blade as recited in claim 13 wherein exactly two or exactly three fiber directions are present.

15. The rotor blade airfoil as recited in claim 1 wherein the airfoil material is ceramic and the fibrous material is also ceramic.

16. The rotor blade airfoil as recited in claim 1 wherein at least 20% are oriented in the first direction.

17. The rotor blade airfoil as recited in claim 1 wherein the first fiber direction is tilted by at least 15° with respect to a radial direction perpendicular to the longitudinal axis.

18. A turbine module comprising the rotor blade airfoil as recited in claim 1.

19. A computer-implemented method for designing a rotor blade airfoil as recited in claim 1 comprising: determining the centrifugal force vector and the gas force vector acting during operation based on a computer model of the rotor blade airfoil, the first fiber direction then being oriented along a direction of force obtained by the vector addition of the centrifugal force vector and the gas force vector.

20. A method for manufacturing a rotor blade airfoil comprising:
designing the rotor blade airfoil according to the method recited in claim 19; and
then manufacturing the rotor blade airfoil by embedding the fibrous material in the rotor blade airfoil material.

21. A rotor blade airfoil for a turbomachine and adapted for rotation about a longitudinal axis of the turbomachine, the rotor blade airfoil comprising:
an airfoil material reinforced with a fibrous material, at least a portion of the fibers of the fibrous material being oriented in a first fiber direction, a second fiber direction and a third fiber direction, the first, second and third fiber directions all being tilted with respect to a stacking axis of the rotor blade airfoil.

22. The rotor blade airfoil as recited in claim 21 wherein the first fiber direction is is tilted by at least 2° and no more than 10° with respect to the stacking axis of the rotor blade airfoil, and the first fiber direction and the second fiber direction in the fibrous material form an angle $\alpha 1$ therebetween, and the first fiber direction and the third fiber direction form an angle $\alpha 2$ therebetween, with $\alpha 1$ and $\alpha 2$ being equal in magnitude and each between 30° and 75°.

* * * * *